March 30, 1954
H. DUCHATELLIER
2,673,501
ROLLER-BLIND SHUTTER, FOR CAMERAS, WITH SINGLE AND GRADUATED TABLE FOR THE WHOLE RANGE OF SPEED EXTENDING FROM FAST SNAPSHOTS TO SLOW EXPOSURE SPEEDS
Filed July 23, 1949
2 Sheets-Sheet 1
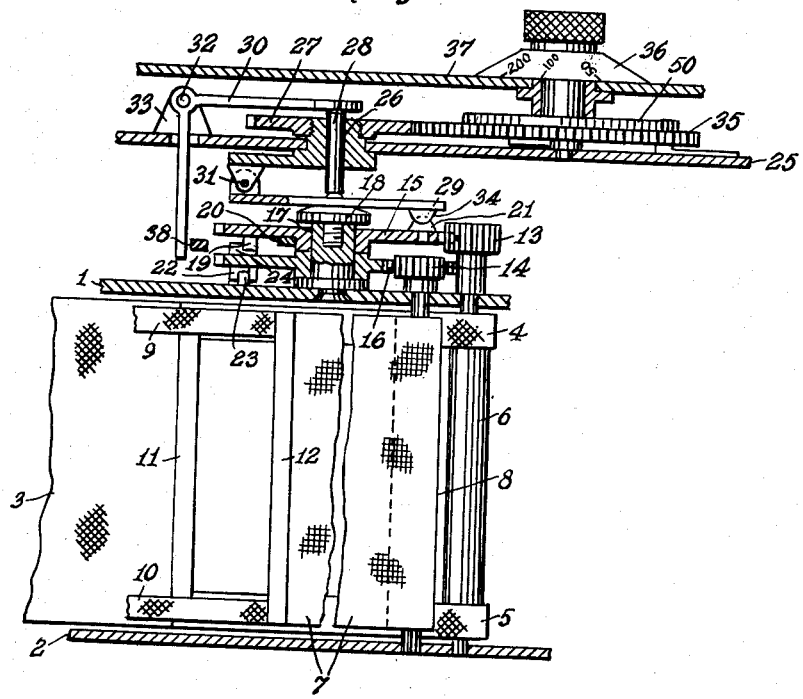
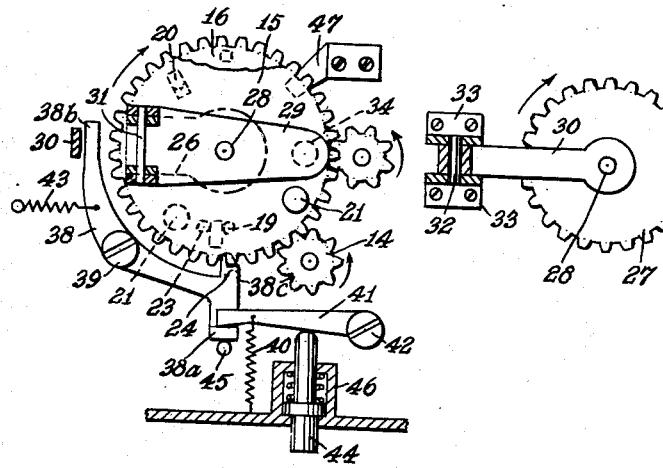
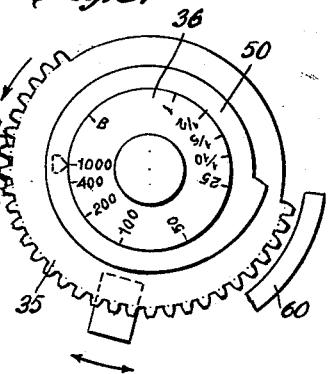
INVENTOR.
HENRY DUCHATELLIER
BY
Robert E. Burns
ATTORNEY March 30, 1954    H. DUCHATELLIER    2,673,501
ROLLER-BLIND SHUTTER, FOR CAMERAS, WITH SINGLE AND GRADUATED
TABLE FOR THE WHOLE RANGE OF SPEED EXTENDING FROM
FAST SNAPSHOTS TO SLOW EXPOSURE SPEEDS
Filed July 23, 1949

INVENTOR.
HENRY DUCHATELLIER
BY
Robert E. Burns
ATTORNEY

Patented Mar. 30, 1954

2,673,501

UNITED STATES PATENT OFFICE 2,673,501

ROLLER-BLIND SHUTTER, FOR CAMERAS, WITH SINGLE AND GRADUATED TABLE FOR THE WHOLE RANGE OF SPEED EXTENDING FROM FAST SNAPSHOTS TO SLOW EXPOSURE SPEEDS

Henry Duchatellier, Courbevoie, France, assignor to Societe dite: Usines Gallus (societe anonyme), Courbevoie, France, a French corporation Application July 23, 1949, Serial No. 106,344

Claims priority, application France July 24, 1948

6 Claims. (Cl. 95—57)

The object of my invention is a focal-plane shutter with two independent roller blinds, unrolling at intervals of variable time, controlled by a single part acting in a gradual manner over the whole range of shutter speeds extending from fast speeds to slow exposure speeds.

It is well known as a matter of fact that there are, on cameras having shutters of the independent roller-blind pattern, devices enabling shutter speeds, known as fast exposures, to be effected, owing to the working of an outer part, an agent of which the action is often connected to the method of carrying the film. Furthermore, the obtaining of the show exposure speeds is effected through a second outer part of which the action causes the connecting-up of devices setting up the slow exposure speeds to the exclusion of fast exposure speeds, this condition however only being fulfilled at the expense of table limitations for the fast exposure snapshots.

The aim of my invention is to cut out at one and the same time the second part and the limitations or dependence.

The object of another characteristic of the invention is to secure a better invariability of snapshots taken with very fast exposure.

It is equally well known that, in the case of focal-plane shutters with two roller-blinds unrolling independently of each other at variable times, the start of the closing roller-blind is influenced by the action of the opening roller-blind on the release parts connected to the table device. This action is expressed most often through the rotary or translational movement of a part fixed rigidly with the opening roller-blind that causes a movement, radial to the axis of the spool of this roller-blind, of the release part of the closing roller-blind. This movement is at each moment in proportion to the travel of the opening rollerblind.

In the case of very fast snapshots, the slit defined by the two roller-blinds is naturally very small, consequently involving a very minor radial change of position. The obtaining of such a movement calls for a very high degree of mechanical skill if it is desired to ensure at one and the same time the accuracy of the snapshot in exact terms and its invariability in relation to fast exposure neighbouring snapshots.

The object of the second characteristic of my invention is to lower to their right proportions these mechanical limitations of precision, since it allows, for similar conditions of execution, a precision to be given that is $2\pi$ times greater than that of certain standard devices.

A more detailed description will now be given of the invention by referring, as an example, to the accompanying drawings showing a method of execution in accordance with the invention and in which:

Figure 1 is a longitudinal section showing the connection of the roller-blinds with the various parts for adjustment and release of the shutter.

Figure 2 is a plan view of these same parts with the shutter set, the plate carrying the indicator mechanism for snapshots and time-exposure assumed to be removed.

Figure 3 is another plan view of this mechanism with the cover of camera removed.

Figure 4:
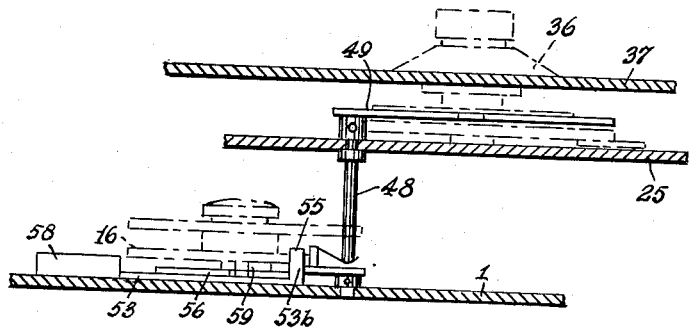
Figure 4 is a part longitudinal section showing the adjusting parts with a view to obtaining slow exposure times.

In Figure 1, are shown two plates 1 and 2 used for holding the shutter properly so called, formed by two roller-blinds the opening roller-blind 3 rolling up by means of two tapes 4 and 5 over a spool 6, and the closing roller-blind 7 rolling up directly on a spool 8 and being kept tight through a spring acting on the two tapes 9 and 10, the opening roller-blind 3 being also kept continually tightened through another spring acting directly on the full portion of the rollerblind opposite to the tapes 4 and 5. The distance separating the opposite lips 11 and 12 of the opening and closing roller-blinds then forms the shutter-slit.

The spool 6 of the opening roller-blind is fixed rigidly with the toothed pinion 13. The spool 8 of the closing roller-blind is fixed rigidly with the toothed pinion 14. These two pinions 13 and 14 have the same number of teeth. They engage respectively with two toothed wheels 15 and 16 having likewise the same number of teeth. These two toothed wheels, turning freely on a spindle 17 are kept fixed in translational movement owing to a screw 18. The wheel 15 has, on its lower plane, a catch-pin 19 and a catch 20 acting as a stop of the opening roller-blind when the latter is completely unset. On its upper plane, the wheel 15 has a tapering touch-needle suitably positioned in regard to the appendages 19 and 20 and causing the start of the closing roller-blinds.

The wheel 16 has on its lower plane an appendage 22 that comes as a stop against the catch 23 located on the plate 1 and thus restricting the rotary movement of this wheel when the shutter is set.

On its upper plane, the wheel 16 has another appendage 24 used for causing the rotary movement of this wheel owing to the catch-pin 19 of the wheel 15. To make the drawing appear clearer, the two appendages 22 and 24, are shown as extended exactly on each side of the wheel. (Figures 1 and 2.)

Figure 1 shows also a plate 25 on which are mounted the various parts working together for the setting of the snapshots and for the release of the closing roller-blind. It takes a hollow spindle 26 turning freely in this plate and restricted in its translational movement owing to a toothed wheel 27 fixed rigidly with this spindle. The latter takes in its centre a sliding gear 28 bearing through its lower portion, on the selective part 29 and through its upper portion, on the release square 30. This touch-needle 28 is free to rotate in the spindle 26, its translational movement being restricted through the discerning action of the parts 29 and 30. That of the selective part 29 is headed tangentially by its rotary movement round the spindle 31 fixed rigidly with the spindle 26. That of the release square is also headed tangentially through its rotary movement around the spindle 32 fixed rigidly with the support 33. The part 29 has, at the end opposite to the spindle 31, a tapering touch-needle 34 coming into contact with the touch-needle 21 and rising at each shutter movement. Its lift involves the turning of the part 29 and consequently the translational movement of the sliding gear 28 and the turning movement of the square 30.

The toothed wheel 27 engages with a toothed wheel 35, with teeth cut out over all the range of a segment. This wheel, actuated by an indicator knob 36 for the various speeds positioned on the cover 37 of the camera, turns freely between the casing 37 and the plate 25.

Figures 2 and 3 show in detail various parts given in Figure 1. Figure 2 gives besides a lever 38 turning round the spindle 39, of which one of the curved ends 38a is kept resting on a stop 45 fixed rigidly with the plate 1 through a spring 40 acting on a lever 41 turning round the spindle 42, and of which the other end 38b comes in contact, after a certain distance covered, with the square 30 when the action of the spring 40 is cut out. This rotary movement of the lever 38 is effected owing to a spring 43 that is less powerful than the spring 40.

The lever 38 has also a nose-piece 38c located at right angles with the stop 24 of the toothed wheel 16 and the object of which is to hold up this wheel when the action of the spring 40 is cut out. This cutting out is effected at the instant of release of the shutter, the pressing of the finger on the knob 44 causing the lever 41 to burn, thus freeing the lever 38 drawn by the spring 43. A spring 46 brings the pin 44 back to its original position when there is no longer pressure of the finger.

A retaining stop 47 restricts on the other hand the rotary movement of the toothed wheel 15 by means of the catch 20 when the opening roller-blind is completely unset.

Figure 5:
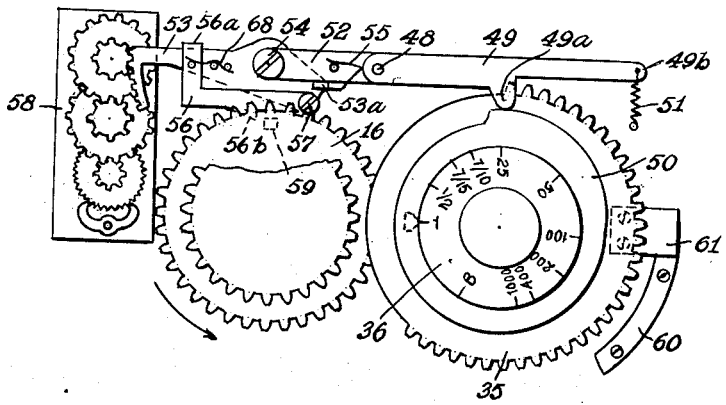
Figure 5 is a part plan view corresponding to Figure 4 and showing these same parts, the plate carrying the indicator mechanism as well as the cover being assumed to be removed.

Figures 4 and 5 are characterised by parts ensuring the adjustment and release for the slow exposure times. A spindle 48 turning freely in the plates 1 and 25, and held axially by them, takes at its upper end the lever 49 of which the nose-piece 49a rests continually on the cam 50 fixed rigidly with the toothed wheel 35 owing to the action of the spring 51 fastened to the end 49b of the lever 49. The spindle 48 takes at its lower end the lever 52 rigidly fastened, as well as the lever 49, to this spindle. A toothed segment 53 pivoting on the spindle 54 of the lever 52 engages with a restrainer device 58 with escapement or with any other system, of which the object is to cause the delay lag of the start of the closing roller-blind 7. It has a square 53 restricting its rotary movement and bearing on the lever 52 owing to the spring 55. A lever 56, hinged at 57 on the segment 53, has a square 56a restricting its rotary movement and bearing on the segment 53 through the action of the spring 58. A nose-piece 56b of the same lever 56 is opposite an appendage 59 of the toothed wheel 16 when the shutter is set.

The cam 50 is formed by a cylindrical segment of which the action works in combination with that of the toothed portion of the wheel 35 and a segment of special contour, of which the positioning and size are connected with the non-toothed segment of the same wheel, so that when the nose-piece 49a of the lever 49 travels over this contour, the wheel 35 does not engage with the wheel 27 and is thus free from it. A fixed stop 60 restricts the travel of the wheel 35 and consequently that of the pin 36 by means of the button 61 fastened on this wheel.

A survey will be given now dealing with the various duties ascribed to the mechanisms disclosed.

When the shutter is set by a mechanism that is not shown on the drawings, and that acts directly on the toothed wheel 15 while causing it to turn in the direction indicated by the arrow (Figure 2), the catch-pin 19 of this wheel draws the appendage 24 of the toothed wheel 16 and consequently the latter, thus causing the simultaneous rotation of the two pinions 13 and 14 as well as that of the corresponding spools 6 and 8 of their respective roller-blinds or tapes 3—4 and 7—9. The comparative arrangement of these two roller-blinds is such that, during the whole setting process, the lips 11 and 12 continually overlap by the same amount on account of the evenness laid down for the advance movements of the two roller-blinds, thus forming a completely opaque assembly protecting the film from any inopportune light during the whole length of time of this procedure.

When finally set, the mechanism is in the position as shown by Figure 2, the appendage 22 of the wheel 16 being in contact with the fixed stop 23 and the catch 19 of the wheel 15 holding back the wheel 16 by means of the appendage 24, the wheels, pinions and roller-blinds tending to resume their unset position on account of the action of the setting springs. When the release button 44 is pressed, the setting mechanism, not shown, acting directly on the toothed wheel 15 is disengaged, thus freeing this wheel. The opening roller-blind 3, drawn by its setting spring, then returns to its unset position, drawing all the gear: spool 6, pinion 13 and wheel 15, this latter in the reverse direction of the arrow (Figure 2), the catch 20 coming into contact with the fixed stop 47 thus restricting the travel of the roller-blind.

The pressing of the button 44 causes on the other hand, before the complete disengaging of the setting mechanism, the rotary movement of the lever 41, thus freeing the lever 38 pulled by the spring 43, so that its nose-piece 38c is engaged in front of the appendage 24 of the wheel 16 while its end 38b comes into contact with the square 30. The wheel 16 connected to the closing roller-blind is held back and its start will be influenced by the action of the various parts connected to the indicator of the required speed.

In the case of the obtaining of a fast snapshot, the indicator knob 36 is placed in the distinctive position for this snapshot, by placing in front of a fixed pointer the reference mark, or such a position, interpolated between two reference marks, corresponding to the desired speed. Figure 3 illustrates for instance the knob for a snapshot of 1/1000. The position of the knob defines that of the cam 50 of the wheel 35 and, on account of its engagement with the wheel 27, that of all the gear formed by the spindle 26, the selective part 29 and its tapering touch-needle 34 (Figures 1 and 2).

At the instant of release, the opening roller-blind starts, as stated hereinabove, drawing the toothed wheel 15 and its tapering touch-needle 21. The latter sweeps across a certain angle of travel, selected with discernment as a function of the snapshot, raises the touch-needle 34 and the selective part 29 that turning round the spindle 30, raises the sliding spindle 28 thus causing the square 30 to swing around its spindle 32. The latter, then in contact with the end 38b of the lever 38, brings about a rotary movement of the latter, the nose-piece 38c disengages from the appendage 24 thus freeing the toothed wheel 16 and consequently the closing roller-blind 7. The slit between the two roller-blinds, corresponding to the snapshot indicated, is thus created, and the latter carry on with their complete unsetting travel, independently of each other, while ensuring the taking of the snapshot.

When the first roller-blind is checked by means of the stop 47, the second one finishes its travel, the slit is shaped again, the two lips 11 and 12 are covered and the appendage 24 renews contact with the catch 19, with everything ready for another setting of the shutter.

In order to make a time exposure, the knob 36 is positioned so that the marker B is opposite the fixed pointer, this indication placing the wheels 35 and 27, and consequently the selective part 29, in a position distinguished by the fact that the tapering touch-needle 21 of the wheel 15, in its sweeping across effected by the unrolling of the opening roller-blind from the "set" position to the "unset" position, does not come at any instant to strike the touch-needle 34 of the selective part 29.

When the shutter is released, everything takes place at the start as for a fast snapshot: the opening roller-blind sets off and carries out its complete travel, with the nose-piece 38c of the lever 38 holding back the closing roller-blind by means of the appendage 29 of the wheel 16. By holding the finger on the release button, the desired exposure is made. By removing the finger the button 44 returns to its position of rest owing to the spring 46, the lever 41 pulled by the spring 40 draws the lever 38 against its stop 45, the nose-piece 38 disengages from the appendage 24 thus freeing the wheel 16 and, consequently the closing roller-blind that thus finishes off the exposure.

A review will be given now for the case of slow speed exposures. They are effected through the action of the restrainer mechanism 58, that causes the deferred delay of the closing roller-blind after the opening roller-blind has carried out its complete unsetting travel. The indicator knob 36 is positioned so that it fixes, on the wheel 35 and consequently on the selective gear formed by the parts 27, 31 and 29, a position that corresponds to the longest fast snapshot; a snapshot distinguished by the shutter slit being of equal length to the exposure gate. The toothed wheel 35 having a break in its teeth is aimed at fulfilling this duty, with the distinguishing position of the selective part 29 being obtained at the exact spot where there is a break in the teeth, this wheel no longer then transmits any motion to the toothed wheel 27. The consequence is that for all slow exposure speeds this position is the same.

As a slow exposure speed is indicated (one second according to Figure 5), the cam 35 takes a position characterised by the fact that its special contour is opposite the nose-piece 49a, of the double lever 49—52 and causes a rotary movement of the double lever round the spindle 48.

The gear mounted at the end of the lever 52 and formed by the segment 53 and its lever 56 held temporarily rigid with the lever 52 owing to the springs 55 and 56, is subjected likewise to the same rotary movement.

The nose-piece 56b of the lever 56 engages then in the distance covered by the appendage 59 of the wheel 16.

When the shutter is set, the wheel 16 turns (reverse direction to the arrow of Figure 5) drawing the appendage 59 that comes in contact with the lever 56, that swivels round the spindle 57. The nose-piece 56b disappears, and returns immediately to its first position after the passing of the appendage 59, owing to the spring 58 and the square 56a.

The setting procedure of the wheel 16 and consequently that of the appendage is such that the latter is stopped at once after the nose-piece 56b has returned to its original position (Figure 5).

When the release button is pressed, the preliminary functions are repeated as previously. At the end of the travel of the unrolling of the opening roller-blind, the tapering touch-needle 34 of the selective part 29 that rises and thus frees the closing roller-blind as any fast snapshot. At this instant, the wheel 16 turns (direction of arrow as shown in Figure 5) but is immediately stopped, with the appendage 59 coming in contact with the nose-piece 56b. The action of the setting spring of the roller-blind then operates on the outfit of levers 53 and 56, the whole assembly swivels round the spindle 54 that has become fixed, and the toothed segment 53 causes the functioning of the restrainer mechanism until the release of the appendage 59 of the nose-piece 56b, thus causing the deferred delay of the start of the closing roller-blind that carries on its travel and finishes off the action of the shutter.

This deferred delay is more especially greater as the nose-piece 56b is more engaged in relation to the outer sweeping of the appendage 59. It is lower than in the opposite case. It is nil for all the fast snapshots and time-exposure, that is to say when the nose-piece 49a of the lever 49 is opposite the cylindrical portion of the cam 50.

It follows from the statement given in regard to my invention and according to a method of execution that the shutter acts through the working together of various parts of which the action is connected with a single and graduated indicator device that enables all snapshots of fast and slow exposure, as well as time-exposures, to be obtained.

It follows, too, that, through the special mounting arrangements, the selective part 29 changes its position in an angular way in the circular space swept by the release part 21, which gives infallibly for the same rotation radius of this part, and the same width of slit, a degree of accuracy that is $2\pi$ times greater than in the case of a radial movement.

I claim:

1. In a focal-plane shutter mechanism, two independent spring-urged shutter curtains disposed in overlying relationship, one of said curtains being a leader curtain and the other a follower curtain, each of said curtains having a set position and a run-down position, means for releasing said leader curtain to move from set to run-down position, a releasable catch for holding the follower curtain in set position, a rotatable member that is operatively connected to and rotated in synchronism with the movement of the leader curtain when said leader curtain is released, trip means carried by said rotatable member and disposed eccentrically of said member, a hollow spindle rotatably supported coaxially with said rotatable member, an arm extending radially of said spindle, a lever extending approximately diametrically of said spindle and pivotally mounted on said arm to swing in an approximately axial plane, said lever and said trip means having cooperating camming surfaces adapted to be engaged with one another by rotation of said rotatable member to swing said lever about its pivot, an axially slidable pin extending through said hollow spindle and engaging said lever so as to be moved axially by pivotal movement of said lever, means operated by said pin to release said catch upon axial movement of said pin and means for setting said spindle in different angular positions relative to the position of said rotatable member when the leader curtain is in set position, whereby the distance the leader curtain travels before the follower curtain is released is determined by the angular setting of said spindle.

2. In a focal-plane shutter mechanism, two independent spring-urged shutter curtains disposed in overlying relationship, one of said curtains being a leader curtain and the other a follower curtain, each of said curtains having a set position and a run-down position, means for releasing said leader curtain to move from set to run-down position, a releasable catch for holding the follower curtain in set position, a rotatable member that is operatively connected to and rotated in synchronism with the movement of the leader curtain when said leader curtain is released, trip means carried by said rotatable member and disposed eccentrically of said member, a hollow spindle rotatably supported coaxially with said rotatable member, a lever extending approximately diametrically of said spindle and pivotally mounted on the spindle at a point eccentric thereof to swing in an approximately axial plane, said lever and trip means having cooperating camming surfaces adapted to be engaged with one another by rotation of said rotatable member to swing said lever about its pivot, an axially slidable pin extending through said hollow spindle and engaging said lever so as to be moved axially by pivotal movement of said lever, means operated by said pin to release said catch upon axial movement of said pin, a pinion fixed on said spindle and indicator means comprising a rotary member having gear teeth meshing with said pinion to turn said pinion and spindle to different angular positions relative to the position of said rotatable member when the leader curtain is in set position and thereby determine the distance the leader curtain travels before the follower curtain is released.

3. In a focal-plane shutter mechanism, two independent spring-urged shutter curtains, namely a leader curtain and a follower curtain disposed in overlying relationship, each of said curtains having a set position and a run-down position, a roller for each of said curtains rotatable upon movement of the respective curtain from one position to the other, a pinion on each of said rollers, first and second rotatable gear wheels meshing with said pinions respectively, said gear wheels being coaxial with one another, means for releasing said leader curtain to move from set to run-down position, a catch engaging a cooperating detent on said second gear wheel releasably to hold the follower curtain in set position, a hollow spindle rotatably supported coaxially with said gear wheels and having an end facing and spaced from said first gear wheel, a lever extending approximately diametrically across said end of the spindle and pivotally mounted on said spindle at a point eccentric thereof to swing in an approximately axial plane, trip means carried on said first gear wheel in a position to engage said lever upon rotation of said first gear wheel, said trip means and lever having cooperating camming surfaces adapted to swing said lever about its pivot upon engagement of said lever by said trip means, an axially slidable pin extending through said hollow spindle and having an end engaging said lever so as to be moved axially by pivotal movement of said lever, means operated by said pin to release said catch upon axial movement of said pin by said lever, and means for setting said spindle in different angular positions relative to the position of said first gear wheel when the leader curtain is in set position and thereby determining the distance the leader curtain travels before the follower curtain is released.

4. In a focal-plane shutter mechanism, two independent spring-urged shutter curtains, namely a leader curtain and a follower curtain disposed in overlying relationship, each of said curtains having a set position and a run-down position, a roller for each of said curtains rotatable upon movement of the respective curtains from one position to the other, a pinion on each of said rollers, first and second rotatable gear wheels meshing with said pinions respectively, said gear wheels being adjacent and coaxial with one another, means for releasing said leader curtain to move from set to run-down position, a catch releasably holding said second gear wheel to hold the follower curtain in set position, a hollow spindle rotatably supported coaxially with said gear wheels and with an end facing and spaced from said first gear wheel, a lever extending approximately diametrically of said end of the spindle and pivotally mounted on said spindle at a point eccentric thereof to swing in an approximately axial plane, trip means carried on said first gear wheel in a position to engage said lever upon rotation of said first gear wheel, said trip means and lever having cooperating camming surfaces adapted to swing said lever about its pivot upon engagement of said lever by said trip means, an axially slidable pin extending through said hollow spindle and resting on said lever so as to be moved axially by pivotal movement of said lever, means operated by said pin to release said catch upon axial movement of said pin by said lever, means for setting said spindle in different angular positions relative to the position of said first gear wheel when the leader curtain is in set position and thereby determining the distance the leader curtain travels before the follower curtain is released, an abutment on said first gear wheel and a cooperating abutment on said second gear wheel engaged by said first mentioned abutment to drive said second gear wheel from said first gear wheel when the leader curtain is moved from run-down to set position, the relative positions of said abutments on said gear wheels, maintaining the curtains in overlapping position during movement from run-down to set position.

5. In a focal-plane shutter mechanism, two independent spring-urged shutter curtains, namely a leader curtain and a follower curtain disposed in overlying relationship, each of said curtains having a set position and a run-down position, means for releasing said leader curtain to move from set to run-down position, catch means for holding the follower curtain in set position, a rotatable member operatively connected to and rotating in synchronism with the movement of the leader curtain when said leader curtain is released, trip means carried by said rotatable member and disposed eccentrically of said member, a hollow spindle rotatably supported coaxially with said rotatable member and having an end facing and spaced from said rotatable member, a lever extending approximately diametrically of said end of the spindle and pivotally mounted on said spindle to swing toward and away from said rotatable member, said lever and said trip means having cooperating camming surfaces adapted to swing said lever about its pivot, a slidable pin extending axially through said hollow spindle and engaging said lever so as to be moved by pivotal movement of said lever, means operated by said pin to release said catch means upon movement of said pin by said lever, a pinion fixed on said spindle, a rotary setting member having around a portion only of its circumference gear teeth meshing with said pinion to turn said pinion and spindle to different angular positions relative to the position of said rotatable member when the leader curtain is in set position and thereby determine the distance the leader curtain travels before the follower curtain is released, a second catch means for releasably holding said follower curtain in set position, variable time delay mechanism for releasing said second catch means a preset time interval after release of said first catch means and means including a cam on said setting member for varying the setting of said time delay mechanism.

6. In a focal-plane shutter mechanism, two independent spring-urged shutter curtains, namely a leader curtain and a follower curtain disposed in overlying relationship, each of said curtains having a set position and a run-down position, first and second rotatable members operatively connected to and rotating in synchronism with the movements of the leader curtain and follower curtain respectively, means for releasing said leader curtain to move from set to run-down position, catch means engaging an abutment on said second rotatable member to hold the follower curtain in set position, a hollow spindle rotatably supported coaxially with said first rotatable member and having an end facing and spaced from said first rotatable member, a lever extending approximately diametrically of said end of the spindle and pivotally mounted on said spindle to swing toward and away from said rotatable member, trip means carried by said first rotatable member and disposed in a position to engage said lever when said member rotates, said trip means and lever having cooperating camming surfaces adapted to swing said lever about its pivot when the lever is engaged by said trip means, a slidable pin extending axially through said hollow spindle and engaging said lever so as to be moved by pivotal movement of said lever, means operated by said pin to release said catch means upon movement of said pin by said lever, a pinion fixed on said spindle, a rotary setting member having around a portion only of its circumference gear teeth meshing with said pinion to turn said pinion and spindle to different angular positions relative to the position of said first rotatable member when the leader curtain is in set position and thereby determine the distance the leader curtain travels before the follower curtain is released by the engagement of said trip means with said lever, a pivoted catch member engaging an abutment on said second rotatable member to hold the follower curtain in set position, time-delay mechanism for retarding the swinging of said catch member about its pivot to release said abutment and thereby release said follower curtain and means including a cam surface on said setting member for varying the position of the pivot of said catch member to vary the amount said catch member must swing to release said abutment and thereby vary the delay of said release.

HENRY DUCHATELLIER.

References Cited in the file of this patent
UNITED STATES PATENTS

| Number | Name | Date |
|---|---|---|
| 1,666,852 | Grosse | Apr. 17, 1928 |
| 2,122,671 | Leitz et al. | July 5, 1938 |
| 2,338,628 | Fairbanks | Jan. 4, 1944 |
| 2,472,607 | Mihalyi | June 7, 1949 |
| 2,512,815 | Svensson | June 27, 1950 |

FOREIGN PATENTS

| Number | Country | Date |
|---|---|---|
| 2,485 | Great Britain | Jan. 31, 1907 |

OTHER REFERENCES

Ser. No. 402,643, A. Wagner (A. P. C.), published May 4, 1943.